R. C. PRYKE.
ROTATABLE CHOCOLATE COOLER.
APPLICATION FILED JULY 21, 1911.
1,033,931.
Patented July 30, 1912.
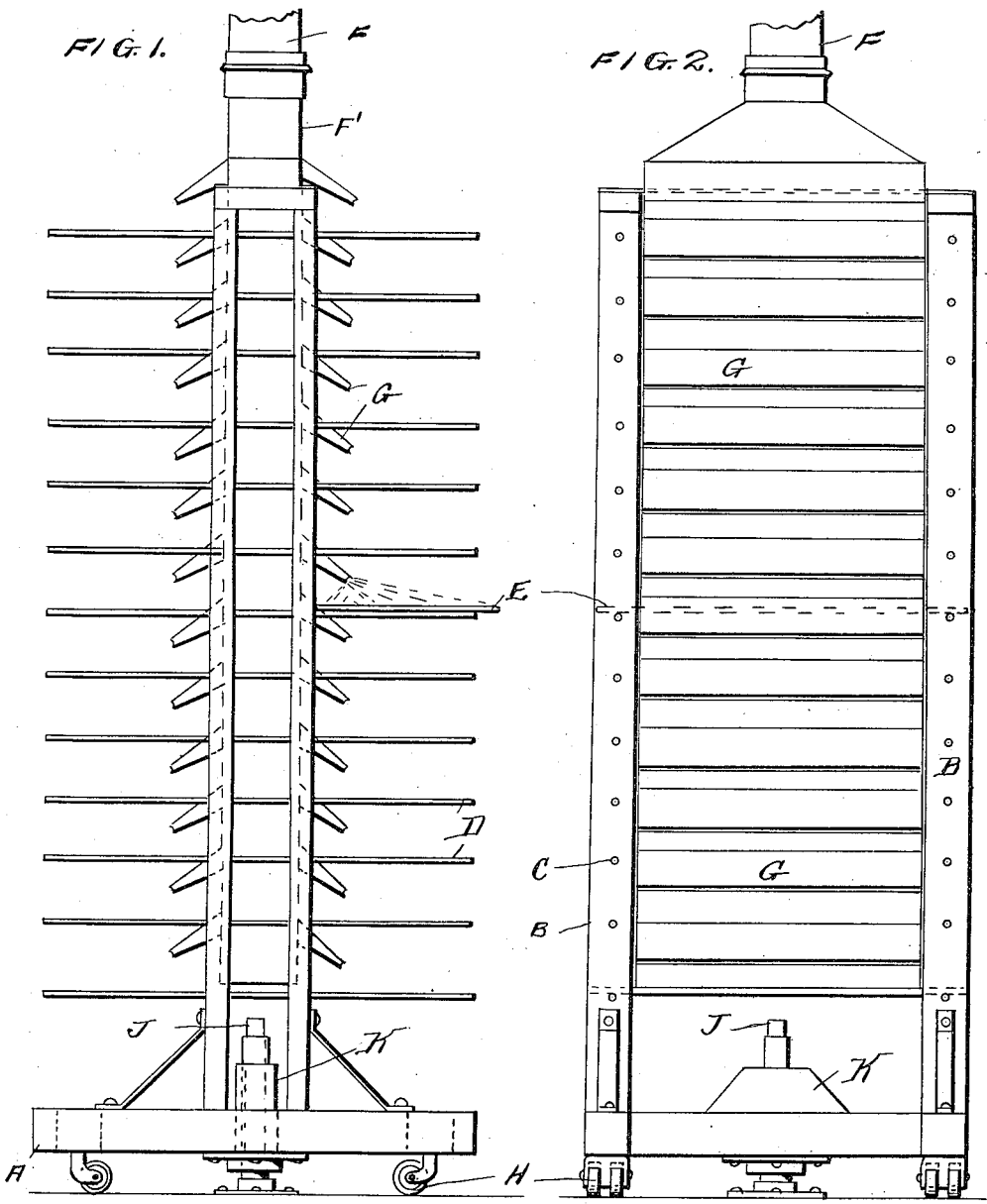
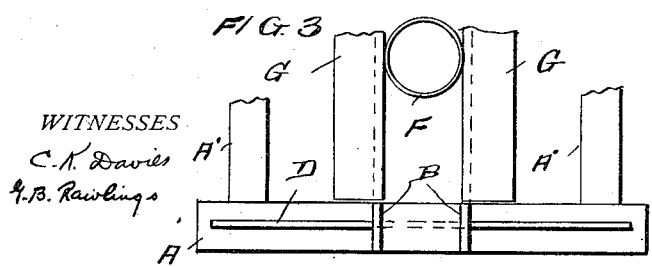

UNITED STATES PATENT OFFICE.

ROBERT CLARKE PRYKE, OF OMAHA, NEBRASKA.

ROTATABLE CHOCOLATE-COOLER.

1,033,931.  Specification of Letters Patent.  Patented July 30, 1912.

Application filed July 21, 1911. Serial No. 639,843.

*To all whom it may concern:*

Be it known that I, ROBERT CLARKE PRYKE, a citizen of the United States, residing at Omaha, in the county of Douglas and State of Nebraska, have invented certain new and useful Improvements in Rotatable Chocolate-Coolers, of which the following is a specification.

My invention relates to improvements in rotatable chocolate coolers adapted for cooling batches of chocolate, but the apparatus may be used for cooling any other confectionery or other goods where it would perform its functions in an efficient and practical manner.

The main object of my invention is the provision of an apparatus which will have a large capacity to permit the cooling of a large amount of candy or chocolate; which will be of simple and inexpensive construction, and while stationary, and to a certain extent rigid, has its mechanism so arranged as to permit it being rotated on an axis, giving ease of placing and taking the goods therefrom; and which will effect the cooling in a rapid and thorough manner, causing more rapid setting and higher finish of the material to be cooled and insuring a practical apparatus for the desired purpose.

To attain the desired object my invention consists of a rotatable cooling apparatus embodying novel features of construction and combination of parts substantially as disclosed herein.

In order that the details of construction and the operation of my apparatus may be clearly understood and its many advantages be fully appreciated I have illustrated in the accompanying drawings a rotatable candy or chocolate cooler constructed in accordance with and embodying my invention.

Figure 1 represents a side or edge view of the apparatus. Fig. 2 represents a front elevation of the apparatus, and Fig. 3 represents a detail view of a part of the cooler.

In the drawings: The base or support comprises the pair of parallel main rails A and the pair of connecting rails A' from which rectangular support rises the two pairs of standards or posts B, which are provided with alining openings C, to receive the tray supporting rods or wires D. These supporting rods are arranged parallel and at equal distances apart and thus form on each side of the standards the series of tray supports upon which are received the flat trays E, only one being shown, which trays contain the batch of material to be cooled.

To supply the air for cooling, a supply pipe F, directs the air downward from a suitable source to an air chamber F' having a series of broad flat tapering nozzles or blowers G, which are inclined downward and are disposed above the tray supports in order that the full blast or supply of air will be directed to the entire contents upon the trays, as will be understood.

The base or support is mounted on the double casters H, and the rigid pivot post J, which passes upward into the sleeve K, secured to the base and in this manner the entire apparatus is capable of a smooth, rapid and easy rotation which quickly effects the cooling of the material.

The many advantages of my apparatus will be readily understood and appreciated by all skilled in the art and it is evident that my improvements insure a practical and useful apparatus for the purpose designed.

I claim:

1. A rotatable cooling apparatus, consisting of a revolving base, a frame supported on the base, a series of tray supports mounted in the frame, and an air supply pipe having nozzles directing air to the tray supports.

2. A rotatable cooling apparatus, consisting of an air supply pipe, a series of broad flat nozzles leading from the supply pipe, and a frame carrying tray supports arranged under said nozzles.

3. A rotatable cooling apparatus, consisting of the rectangular base, the casters carried by the base, the pivot post upon which the base revolves, the two pairs of standards rising from the base, the rods passing through said standards and forming tray supports, the air supply pipe and the broad flat nozzles located above and adjacent to the tray supports.

ROBERT CLARKE PRYKE.

Witnesses:
H. R. BUSHNELL,
E. J. SNYDER.

Copies of this patent may be obtained for five cents each, by addressing the "Commissioner of Patents, Washington, D. C."